Jan. 12, 1926.
C. BUJGER
ROLLING TOY
Filed March 7, 1925
1,569,172
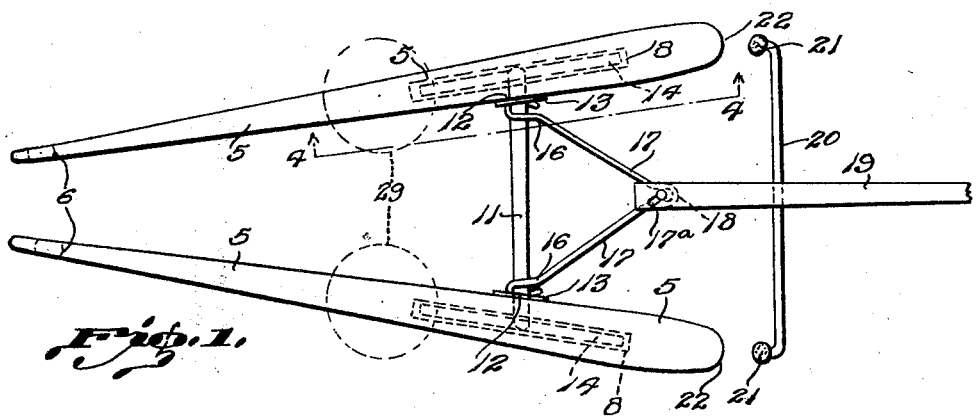
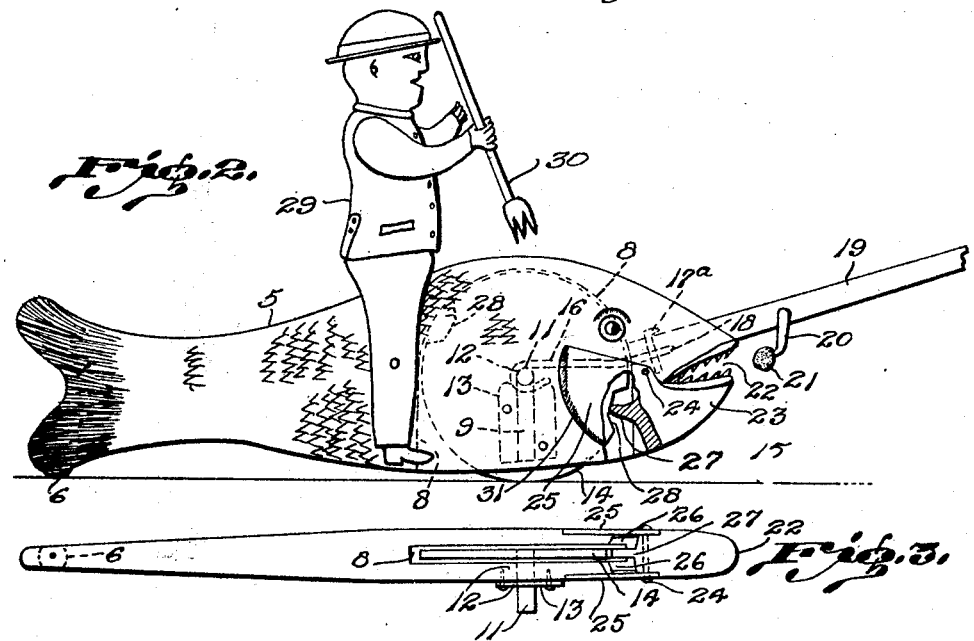
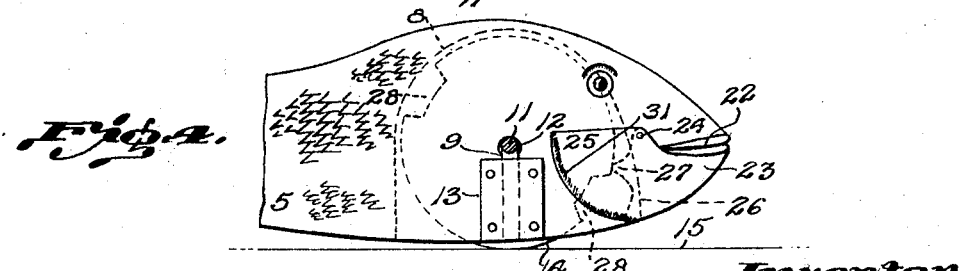
Inventor
Cyril Bujger
By David E. Carlsen
Attorney Patented Jan. 12, 1926.

1,569,172

UNITED STATES PATENT OFFICE.

CYRIL BUJGER, OF ST. PAUL, MINNESOTA.

ROLLING TOY.

Application filed March 7, 1925. Serial No. 13,890.

*To all whom it may concern:*

Be it known that I, CYRIL BUJGER, a citizen of the United States, residing at St. Paul, in the county of Ramsey and State of Minnesota, have invented certain new and useful Improvements in Rolling Toys, of which the following is a specification.

This invention relates to toys and its special object is to provide a toy adapted to be pulled or pushed over a floor or other surface and represents a pair of fish racing for bait and simulating the swimming movement of fish.

In the accompanying drawing:

Fig. 1 is a top view of the toy.

Fig. 2 is a side elevation of the toy with a fisherman added and represented as riding astride either fish in a position showing the fisherman about to spear the fish, and the mouth of the fish open.

Fig. 3 is a bottom view of one of the fish in Fig. 1.

Fig. 4 is a section on the line 4—4 in Fig. 1 with the mouth of the fish closed.

Referring to the drawing by reference numerals, 5 designate a pair of fish, each of which has a button shaped support 6 to make the tail 7 ride easily on a floor. The main body of each fish has a downwardly opening mortise 8 with a vertical gap 9 at its inner side (best shown in Fig. 4) and a central bearing 12 in which is journaled one end of a transverse horizontal axle 11, the inward side of each fish having said journal bearing formed of the upper terminal of the gap 9 and the upper end of the plate 13 which is secured upon the inner side of the fish to close the gap 9 after it has received the axle. Near each end of the axle is secured to it in a slanting position a ground wheel 14 which depends downwardly to the floor or surface 15 so that when the toy is moved forward the wheels cause the two fish to swing their heads and likewise their tails toward and away from each other thus resembling fish in swimming motion.

The axle rotates in a pair of simple bearings 16, in the present instance formed of wire and united by a staple shaped shank 17 which is held by a pin 17ª in a notch 18 in the rear end of a handle rod 19 by which the toy may be either pulled or pushed over the floor or other surface as the case may be.

From each side of the rod 19 extends an arm 20 carrying a "bait" 21 a short distance forward of the mouth of each fish. Said mouth has its lower jaw 23 pivoted at 24 and formed with a rearwardly extending thin plate 25 representing the usual outer covering of the gills of a fish; said plates also helping to conceal the space 26 in which the jaw is formed with a tappet 27 which by the weight of the chin or front part of the jaw is constantly held in contact with the face of the wheel 14 so as to hold the fish mouth closed. The wheel however has radial notches 28 into which the tappet will drop one or more times during each turn of the wheel, and when this takes place the mouth of the fish will suddenly open and close again just as the live fish would do in trying to catch a bait.

On some of these toys I may secure upon the back of each fish a figure of a man 29 holding in his hand a spear 30 in position for spearing the fish.

The fish may be made of wood, aluminum, tin or other suitable materials and may be painted to resemble different kinds of fish. It will be well also to make the line 31 a red color to resemble fish gills; and it will be understood that whenever the mouth opens and closes the gills also move because they are projections of the part forming the lower jaw.

The human figures I make in various forms to simulate fishermen, clowns, monkeys, or the figures may even represent a cat using its front paw for a spear.

What I claim is:

1. A toy comprising an axle, a supporting wheel fixed on each end of the axle in slanting relation to the axle, the figure of a fish journaled on each end of the axle and having an inverted cavity inclosing the wheel except a small portion of its lower segment, a handle journaled on the axle between the wheels for moving the toy, and slidable means supporting the tail end of each fish.

2. The structure specified in claim 1 in which the lower jaw of each fish is pivoted to swing up and down and is held in one position by its own weight and means on the adjacent ground wheel for swinging and holding it at intervals in the other position.

3. The structure specified in claim 1 in which the lower jaw of each fish is pivoted so as to be closed and opened and having simulations of gills moving when the jaw is moved and a tappet concealed between the right and left gill, and the adjacent supporting wheel having one or more notches receiving the tappet when the jaw is to open by its own weight.

4. The structure specified in claim 1, and a figure simulating a human being mounted upon each fish and holding a spear in readiness to spear the fish.

5. The structure specified in claim 1 in which the handle rod has side arms and imitation baits carried thereby, one bait in fixed position forward of the fish.

In testimony whereof I affix my signature.

CYRIL BUJGER.